United States Patent [19]

Iwanaga

[11] Patent Number: 4,628,774

[45] Date of Patent: Dec. 16, 1986

[54] TRANSMISSION CONTROL SYSTEM INCLUDING SELECT SHOCK SUPPRESSING ARRANGEMENT

[75] Inventor: Kazuyoshi Iwanaga, Atsugi, Japan

[73] Assignee: Nissan Motor Company, Limited, Yokohama, Japan

[21] Appl. No.: 574,729

[22] Filed: Jan. 30, 1984

[30] Foreign Application Priority Data

Feb. 2, 1983 [JP] Japan .................................. 58-14593

[51] Int. Cl.⁴ ............................................... B60K 41/06

[52] U.S. Cl. ......................................... 74/867; 74/865; 74/877

[58] Field of Search .................. 74/865, 868, 877, 867

[56] References Cited

U.S. PATENT DOCUMENTS

| | | | |
|---|---|---|---|
| 3,881,372 | 5/1975 | Miyauchi et al. | 74/867 |
| 3,890,856 | 6/1975 | Miyauchi et al. | 74/869 |
| 4,020,718 | 5/1977 | Miyauchi et al. | 74/869 |
| 4,298,109 | 11/1981 | Doerpmund et al. | 192/0.044 |
| 4,308,765 | 1/1982 | Iwanaga et al. | 74/867 X |
| 4,331,045 | 5/1982 | Piech et al. | 74/867 |
| 4,334,441 | 6/1982 | Iwanaga et al. | 74/868 |
| 4,346,626 | 8/1982 | Kawamoto | 74/866 |
| 4,406,181 | 9/1983 | Kubo et al. | 74/86 |
| 4,464,955 | 8/1984 | Martin et al. | 74/867 |
| 4,467,675 | 8/1984 | Sugano et al. | 74/868 X |
| 4,476,745 | 10/1984 | Moan | 74/868 X |

*Primary Examiner*—Kenneth J. Dorner
*Assistant Examiner*—Dwight G. Diehl

[57] ABSTRACT

In order to ensure that an adequately high gear ratio (such as top gear) is engaged momentarily before the first gear ratio and thus reduce select shock when a manual selector valve is moved from neutral (N) to drive (D) while simultaneously enabling the provision of a flow restriction required to ensure smooth automatic upshifting, a valve which by-passes the flow restriction is provided. This by-pass valve includes a chamber provided with a drain port which is closed by a device (such as a solenoid valve) responsive to an engine associated with the transmission entering an idling condition. The chamber is supplied line pressure from the manual selector valve when the latter is moved from the N to D position so that when the engine is idling and the N-D select is made, the valve is moved to a position wherein the flow restriction is by-passed and line pressure fed unrestrictedly to the friction elements which condition the transmission to provide high gear ratio slightly before those which produce the first gear ratio. As soon as the engine ceases to idle the chamber is drained, the valve is returned to its normal position, the friction elements which produce the high gear ratio are drained and the flow restriction rendered effective again for normal automatic shifting.

6 Claims, 2 Drawing Figures

TRANSMISSION CONTROL SYSTEM INCLUDING SELECT SHOCK SUPPRESSING ARRANGEMENT

BACKGROUND OF THE INVENTION

1. Field of the Invention

The present invention relates generally to an automatic automotive transmission and more specifically to a control system for same which enables select shock and shift shock attenuation.

2. Description of the Prior Art

In an automatic automotive transmission there is a general tendancy for so called "select shock" to be produced when a manual selector valve is moved from neutral (N) to the forward automatic drive range (D) due to the sudden coupling of the engine to the transmission (via a torque converter or the like). A known method of reducing this phenomenon is to couple the friction elements which produce a high speed gearing (preferably the highest) just prior to those which produce first speed so as to reduce the effect of engine torque on the transmission.

One method of reducing the above mentioned select shock is to detect engine idling and feed line pressure to the shift valves in place of the normal governor pressure under such circumstances, to induce same to assume their respective upshift positions. However, in the case of a three speed transmission wherein two clutches (e.g., a foward clutch and a high and reverse clutch) are provided, wherein first gear is produced when the forward clutch is engaged and third gear is produced by engaging both of the clutches and wherein a one-way clutch is utilized so that first gear can be produced by engaging only the forward clutch; in order to reduce select shock, it is necessary to ensure that the high and reverse clutch is engaged slightly before the forward clutch. To achieve this it is possible to provide a flow restriction in the passage through which hydraulic fluid is fed to the forward clutch and no restriction or orifice in the fluid circuit through which the high and reverse clutch is pressurized. On the other hand, in order to prevent shift shock during a 2–3 shift, the pressure in the high and reverse clutch must be raised slowly enough to allow time for the release of the brake engaged to produce second gear. Viz., to reduce select shock it is necessary to rapidly pressurize the high and reverse clutch while, on the contrary, during a 2–3 shift the pressurization must be suitably delayed to avoid shift shock. Accordingly, a simple control arrangement via which both of these conflicting requirements can be readily obtained has been wanting.

SUMMARY OF THE INVENTION

It is an object of the present invention to provide a control system for a automatic automotive transmission which is simple and which can attenuate both select as well as shift shock.

In brief, the present invention takes the form of a transmission control system wherein, in order to ensure that an adequately high gear ratio (such as top gear) is engaged momentarily before the first gear ratio and thus reduce select shock when a manual selector valve is moved from neutral (N) to drive (D) while simultaneously enabling the provision of a flow restriction required to ensure smooth automatic upshifting, a valve which by-passes the flow restriction is provided. This by-pass valve includes a chamber provided with a drain port which is closed by a device (such as a solenoid valve) responsive to an engine associated with the transmission entering an idling condition. The chamber is with line pressure from the manual selector valve when the latter is moved from the N to D position so that when the engine is idling and the N-D select is made, the valve is moved to a position wherein the flow restriction is by-passed and line pressure fed unrestrictedly to the friction elements which condition the transmission to provide high gear ratio slightly before those which produce the first gear ratio. As soon as the engine ceases to idle, the chamber is drained, the valve is returned to its normal position, the friction elements which produce the high gear ratio are drained and the flow restriction rendered effective again ready for normal automatic shifting.

More specifically, the present invention takes the form of a control system for an automatic automotive transmission having first and second hydraulically operated engagement devices and wherein, when the first engagement device is released and the second engagement device is engaged, a first predetermined gear ratio or speed is established and when both of the first and second engagement members are engaged a gear ratio higher than said predetermined one is established, and which features a first hydraulic circuit via which hydraulic fluid is supplied to the first engagement device, a manual selector valve fluidly interposed between the circuit and a source of hydraulic fluid under pressure, the manual selector valve being movable between a neutral position and a drive position wherein fluid communication between the source and the circuit is interrupted and established, respectively, a delay disposed in the hydraulic circuit for limiting the rate at which hydraulic fluid can be supplied to the first engagement device, a device for detecting an idling condition of an engine associated with the transmission, and a by-pass valve operatively connected with the idling detecting device, the by-pass valve by-passing the delay when the idling detecting device detects the idling condition and the manual selector valve is moved from the neutral position to the drive position to permit hydraulic fluid to be freely supplied to the first engagement device.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
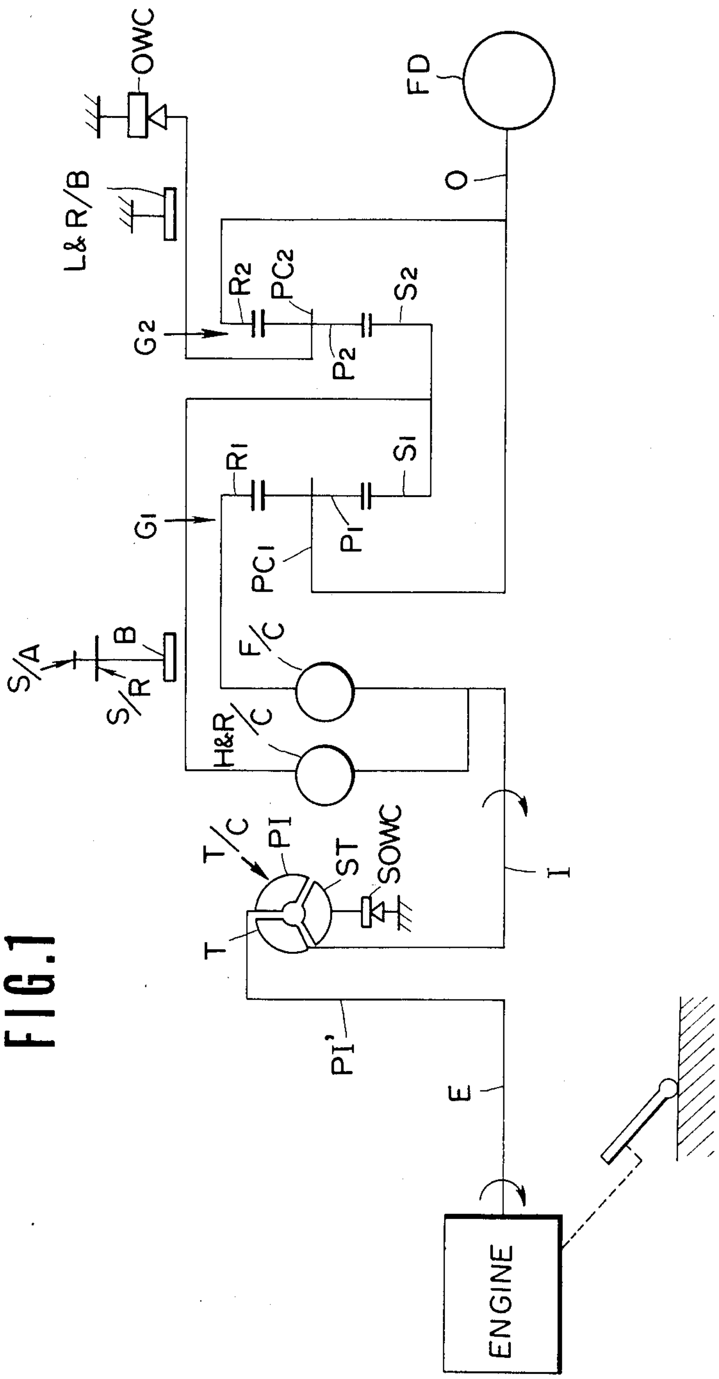
FIG. 1 is a schematic view of a three speed transmission in which the present invention finds application.

FIG. 1 shows in schematic form a three forward and one reverse speed transmission gear train to which an embodiment of the present invention is applied. This arrangement, as shown, includes an input shaft I which is operatively connected with an output shaft E of an engine via a torque converter T/C, an output shaft 0 which is operatively connected with a final drive unit FD, a first planeary gear set $G_1$, a second planetary gear set $G_2$, a high and reverse clutch H&R/C, a forward clutch F/C, an intermediate band brake B, a low and reverse brake L&R/B and a one-way clutch OWC.

The first planetary gear set $G_1$ includes a sun gear $S_1$, a ring gear $R_1$ and interconnecting pinion gears $P_1$ carried on a pinion carrier $PC_1$. The second set $G_2$ includes a sun gear $S_2$, a ring gear $R_2$ and interconnecting pinion gears $P_2$ carried on a carrier $PC_2$. As shown, the carrier $PC_1$ of the first planetary gear set $G_1$ is connected with the output shaft 0 while the sun gear $S_1$ and the ring gear $R_1$ thereof are selectively connectable with the input shaft I via the high and reverse clutch H&R/C and the forward clutch F/C, respectively. The ring gear $R_2$ of the second plan set $G_2$ is connected to the output shaft 0 while the pinion carrier $PC_2$ is connected with the transmission casing (no numeral) through the one-way clutch OWC and selectively connectable therewith via the low and reverse brake L&R/B. The sun gears $S_1$ and $S_2$ are interconnected and selectively connectable with the transmission casing through the intermediate band brake B.

In this arrangement the band brake B is controlled by a hydraulic servo mechanism including a servo apply chamber S/A and a servo-release chamber S/B. The effective area of the servo apply chamber S/A is less than that of the servo release chamber S/B so that introduction of hydraulic fluid into the apply chamber S/A applys the band brake B while the introduction of the same pressure in the release chamber S/R releases the brake irrespective of the presence of the same pressure in the apply chamber.

The torque converter T/C includes a pump impeller PI' a turbine runner T and a stator ST. The pump impeller PI is connected with the engine output shaft E through the torque converter cover PI' while the turbine runner T is connected to the input shaft I and the stator to the transmission casing through a oneway clutch SOWC.

Selective application of the high and reverse clutch H&R/C, forward clutch F/C, brand brake B and low and reverse brake L&R/B enables the production of three forward speeds (or gear ratios) and one reverse speed as shown in the table below. In this table the symbol 0 denotes engagement. It will be also noted that, in the event that the low and reverse brake is not applied to produce first speed, an engine braking function is not provided.

| | | | L & R/B | B | |
|---|---|---|---|---|---|
| | H & R/C | F/C | (OWC) | S/A | S/A |
| 1'st speed | | o | o | | |
| 2'nd speed | | o | | o | |
| 3'rd speed | o | o | | o | o |
| Reverse | o | | o | | |

Figure 2:
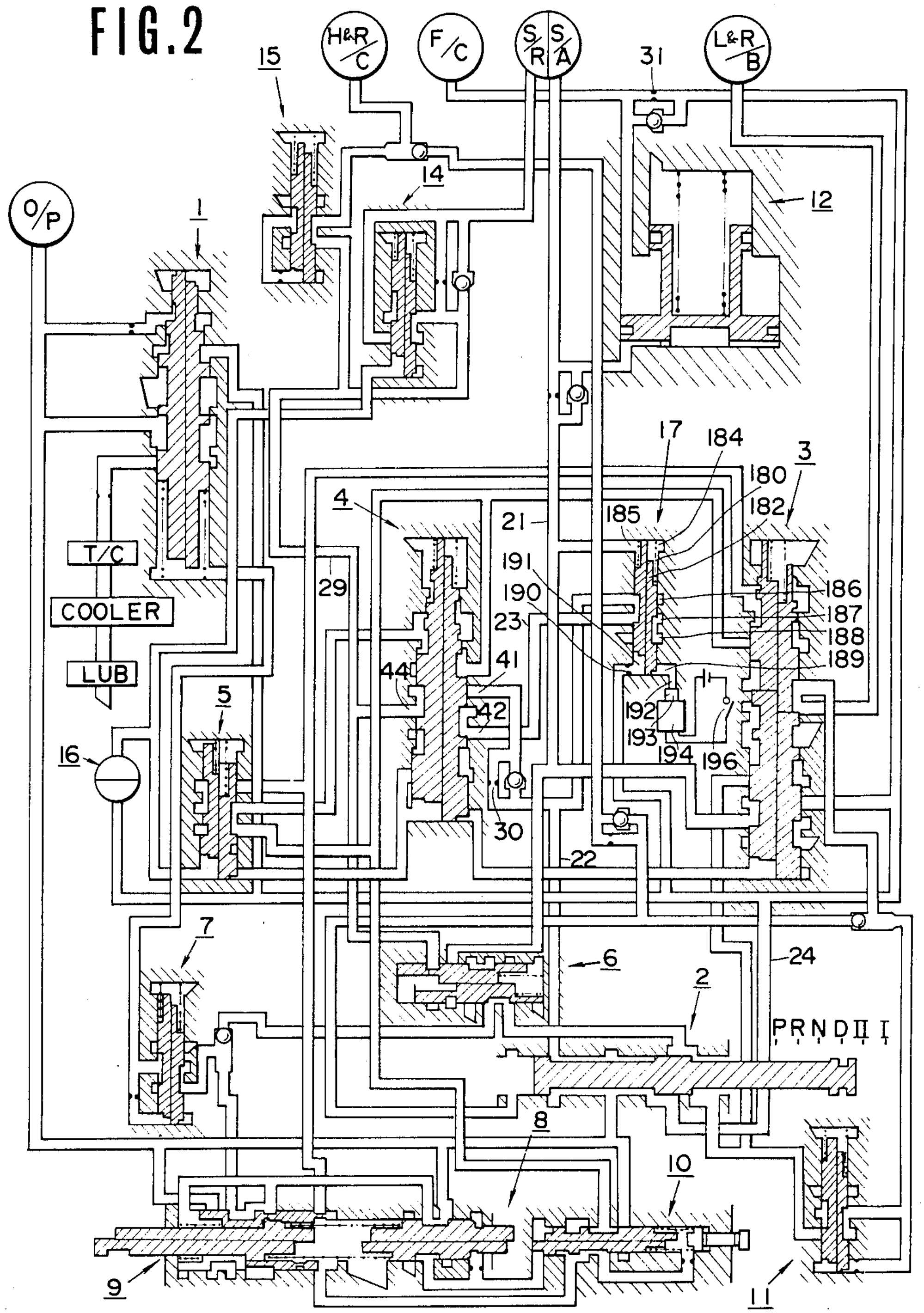
FIG. 2 shows a hydraulic control circuit for the FIG. 1 transmission which incorporates the present invention.

FIG. 2 shows a hydraulic control arrangement via which the above described brakes and clutches are selectively applied and released. This arrangement includes an oil pump O/P, a regulator valve 1, a manual selector valve 2, a 1–2 shift valve 3, a 2–3 shift valve 4, a 3–2 downshift valve 5, a line pressure booster valve 6, a pressure modifying valve 7, a throttle valve 8, a throttle failsafe valve 9, a throttle modulator valve 10, a first gear range pressure reducing valve 11, an accumulator 12, a 3–2 timing valve 13, a high and reverse pressure reduction valve 15, a governor valve 16 and an idle control valve 17. The construction and operation of this arrangement with the exception of the latter mentioned idle control valve is essentially the same as that disclosed in European Patent Application Patent Publication No. 0 059 425 on Sept. 8, 1982 the disclosure of which is incorporated herein by reference.

In this embodiment, the idle control valve 17 comprises a spool bore 180, a spool 182 reciprocatively disposed therein and a spring 184 which biases the spool 182 downward (as seen in the drawings). The bore is formed with ports 185, 186, 187, 188 and 189. As shown, the port 185, communictes with passage 21 which supplies the servo-apply chamber S/A. Port 186 is connected with passage 22 which leads from the manual selector valve to the 2–3 shift valve 4 and which is pressurized when the manual selector valve 2 is set in any one of the D, N or R positions. This passage 22 includes a one-way flow restriction arrangement including an orifice 30 which delays the pressure transmission therethrough to a port 41 of the 2–3 shift valve 4. Port 187 fluidly communicates with a port 42 of the 2–3 shift valve 4 via conduit or passage 23. Port 188 functions as a drain. Port 189 fluidly communicates with passage 24 which is pressurized when the manual selector valve 2 is set in any of the positions D, II, or I. An orifice 190 is disposed in port 189 upstream of the chamber 191 defined in the bore 180 by the lower end of the spool 182. This chamber 191 is provided with a drain port 192 which may be selectively closed by a valve member 193 which in this embodiment takes the form of a plunger selectively movable under the influence of solenoid 194.

As schematically shown, the solenoid 194 is arranged to be energized upon the closure of switch 196 which in the instant embodiment is arranged to closed upon an accelerator pedal (see FIG. 1) associated with the engine, assuming a fully released position. Upon closure of the switch 196 the solenoid 194 is energized and port 191 closed.

With this arrangement, while the accelerator pedal is depressed the solenoid 194 remains deenergized whereby the drain port 192 remains open and the pressure in the chamber 191 assumes an essentially zero level due to the provision of the orifice 190. Accordingly, the spool 182 remains in the position indicated in the drawings by the right hand half thereof, under the influence of the spring 184 and/or the pressure prevailing in conduit 21. In this state the operation of the transmission control arrangement is exactly the same as that disclosed in the reference referred to hereinbefore.

Viz., upon a 2–3 shift the spool of the 2–3 shift valve 4 moves from its downshift position (right hand half) to its upshift position (left hand half) thus bringing port 41 into fluid communication with port 44 whereby hydraulic pressure is transmitted to the high and reverse clutch H&R/C through a shuttle valve and the servo-release chamber S/R. Due to the inclusion of the flow restriction 30 in the circuit, the pressure in the high and reverse clutch H&R/C builds at a rate suitable for attenuating shift shock. Upon a 3–2 downshift (such as under kickdown) the shift valve spool returns to its downshift position, placing ports 44 and 42 in fluid communication. However, as the spool 182 is in a position wherein the port 187 and drain port 188 are in communication at this time the preessure in the high and reverse clutch H&R/C is rapidly discharged unrestrictedly through the shuttle valve above conduit 29, ports 44, 42, conduit 23 and ports 187, 188.

When the manual selector valve 2 is moved from D to N when the vehicle is stopped and the accelerator is released, switch 196 is closed and the solenoid 194 energized. At this time it should be noted that the conduit 24 is not pressurized due to the manual selector valve being in the N position. However, upon an N-D select being made, hydraulic pressure is fed through conduit 24 pressurizing chamber 191 and driving the spool 182 upwardly against the bias of spring 184. In this position ports 186 and 187 of the idle control valve 17 are placed in communication and hydraulic pressure (line pressure) from conduit 22 is by-passed around the orifice 30 and fed unrestricted through conduit 23, via ports 42, 44 of the shift valve (which is in its downshift position due to zero governor pressure) via conduit 29 to the H&R/C which is rapidly pressurized and engaged. Simultanously, pressure is fed through conduit 24 to the forward clutch F/C. However, due to the provision of the orifice 31 therein, the pressure in the high and reverse clutch H&R/C is permitted to build more rapidly than that in the forward clutch F/C whereby third speed is assuredly engaged before first speed.

Upon depression of the accelerator (e.g. to move the vehicle from standstill) the solenoid 194 is deenergized and the pressure in the chamber 191 reduced to zero due to the opening of the drain port 192. With this, the spool 182 is returned under the influence of the spring 184 to the position wherein it closes communication between ports 186, 187 and establishes communication between ports 187 and 188. This of renders the orifice 30 effective again for shift shock suppression and conditions the transmission for operation in first speed.

Of course it will be appreciated that the above is merely an embodiment of the present invention and that various modifications can be made thereto without departing from the scope thereof. For example, orifice 30 may be replace with a suitable valve arrangement if deemed advantageous.

What is claimed is:

1. In a control system for an automatic automotive transmission having first and second hydraulically operated engagement devices and wherein when said first engagement device is released and said second engagement device is engaged, a first predetermined gear ratio is established and when both of said first and second engagement members are engaged a gear ratio higher than said predetermined one is established, a first hydraulic circuit via which hydraulic fluid is supplied to said first engagement device;

a manual selector valve fluidly interposed between said circuit and a source of hydraulic fluid under pressure, said manual selector valve being movable between a neutral position and a drive position wherein fluid communication between said source and said circuit is interrupted and established, respectively;

a delay disposed in said hydraulic circuit for limiting the rate at which hydraulic fluid can be supplied to said first engagement device;

a device for detecting an idling condition of an engine associated with said transmission; and a by-pass valve operatively connected with said idling detecting device, said by-pass valve by-passing said delay when said idling detecting device detects said idling condition and said manual selecto valve is moved from said neutral position to said drive position to permit hydraulic fluid to be freely supplied to said first engagement device.

2. A control system as claimed in claim 1, further comprising a second hydraulic circuit fluidly interconnecting said manual selector valve with a third engagement device which when engaged while said first engagement device is released and said second engagement device is engaged, produces a gear ratio intermediate of said predetermined gear ratio and said higher gear ratio, said second circuit being fluidly connected with said by-pass valve so that when hydraulic fluid is fed to said third engagement device, said by-pass valve is conditioned to not by-pass said delay and render same effective.

3. A control system as claimed in claim 1, wherein said by-pass valve includes:

a spool reciprocatively disposed in a bore and biased in a first direction toward a first position by a spring, said spool defining a first chamber in said bore which fluidly communicates with said second circuit, said chamber being arranged so that when hydraulic fluid is supplied thereinto a bias is applied to said spool which moves same in said first direction, means defining a second chamber in said bore which communicates with said second engagement device via a flow restrictor; and a mechanism responsive to said idling detecting device which closes a drain port of said second chamber upon said idling condition being detected, said second chamber being arranged so that hydraulic pressure therein produces a bias which moves said spool in a second direction opposite said first direction and toward a second position wherein said delays is by-passed.

4. A control system as claimed in claim 1, wherein said second engagement device is supplied hydraulic fluid from said source when said manual selector valve is in said drive position via a flow restriction.

5. A control system as claimed in claim 1, wherein said first hydraulic circuit includes a shift valve having an upshift position and a downshift position and which has a first port in fluid communication with said delay and a second port in fluid communication with said by-pass valve for receiving hydraulic pressure therefrom when said by-pass valve is in said second position thereof, said shift valve being arranged to establish fluid communication between said first port and said first engagement device and said second port and said first engagement device when in its upshift and downshift positions, respectively.

6. A control system as claimed in claim 3, wherein said idling detecting device takes the form of a switch which is operated when a manually operable member associated with said engine is moved to an idling inducing position and wherein said mechanism takes the form of a solenoid operated valve responsive to the closure of said switch.

* * * * *